(12) United States Patent
Oggero

(10) Patent No.: US 10,060,351 B2
(45) Date of Patent: Aug. 28, 2018

(54) DE-ICING DEVICE FOR A SPLITTER NOSE OF AN AXIAL TURBINE ENGINE COMPRESSOR

(71) Applicant: Safran Aero Boosters SA, Herstal (Milmort) (BE)

(72) Inventor: Quentin Oggero, Boncelles (BE)

(73) Assignee: Safran Aero Boosters SA (BE)

(*) Notice: Subject to any disclaimer, the term of this patent is extended or adjusted under 35 U.S.C. 154(b) by 0 days.

(21) Appl. No.: 15/292,855

(22) Filed: Oct. 13, 2016

(65) Prior Publication Data

US 2017/0107906 A1 Apr. 20, 2017

(30) Foreign Application Priority Data

Oct. 15, 2015 (BE) .................. 2015/5662

(51) Int. Cl.
| | |
|---|---|
| *F01D 25/02* | (2006.01) |
| *F02C 7/047* | (2006.01) |
| *B64D 15/04* | (2006.01) |
| *F01D 9/02* | (2006.01) |
| *F01D 11/00* | (2006.01) |
| *F04D 29/52* | (2006.01) |

(Continued)

(52) U.S. Cl.
CPC ............. *F02C 7/047* (2013.01); *B64D 15/04* (2013.01); *F01D 9/02* (2013.01); *F01D 9/041* (2013.01); *F01D 11/003* (2013.01); *F01D 25/02* (2013.01); *F04D 29/522* (2013.01); *B64D 2033/0233* (2013.01); *F02C 6/08* (2013.01); *F02C 9/18* (2013.01)

(58) Field of Classification Search
CPC ............... F01D 25/02; F05D 2260/201; F05B 2260/201; F02C 7/047; F02C 6/08; F02C 9/18; B64D 15/02; B64D 15/04; B64D 2033/0233

USPC ................ 415/144, 145, 176–178
See application file for complete search history.

(56) References Cited

U.S. PATENT DOCUMENTS

| | | |
|---|---|---|
| 2003/0035719 A1 | 2/2003 | Wadia et al. |
| 2012/0192544 A1 | 8/2012 | Roby et al. |

(Continued)

FOREIGN PATENT DOCUMENTS

| | | | |
|---|---|---|---|
| EP | 2481893 A2 | 8/2012 | |
| WO | 2014182289 A1 | 11/2014 | |
| WO | WO-2014/182289 A1 * | 11/2014 | ............. F01D 25/02 |

OTHER PUBLICATIONS

European Search Report from corresponding Belgium Application No. BE 201505662, dated Jun. 20, 2016.

*Primary Examiner* — Christopher Verdier
(74) *Attorney, Agent, or Firm* — Sandberg Phoenix & von Gontard P.C.

(57) ABSTRACT

A de-icing device for a splitter nose of a dual-flow turbine engine compressor. The device comprises a splitter nose that has an inner flange and that separates a primary flow and a secondary flow, a shroud arranged on the inside of the annular wall and bearing an annular row of vanes and an abradable seal, a de-icing annular space for circulating a de-icing fluid between the nose and the shroud, a partition annularly dividing the annular space including an outer radial flange attached to the inner flange of the splitter nose using the same bolts that are used to attach the outer shroud. The nose has a radial flange for centering the partition, providing a press fit that optimizes the seal.

16 Claims, 2 Drawing Sheets

(51) Int. Cl.
*F01D 9/04* (2006.01)
*F02C 6/08* (2006.01)
*F02C 9/18* (2006.01)
*B64D 33/02* (2006.01)

(56) References Cited

U.S. PATENT DOCUMENTS

| | | | | |
|---|---|---|---|---|
| 2014/0161597 A1* | 6/2014 | Thise | ............ | F01D 25/02 |
| | | | | 415/176 |
| 2016/0097323 A1* | 4/2016 | Prather | ............ | F01D 25/02 |
| | | | | 415/178 |
| 2017/0321604 A1* | 11/2017 | Lourit | ............ | F02C 7/047 |

* cited by examiner

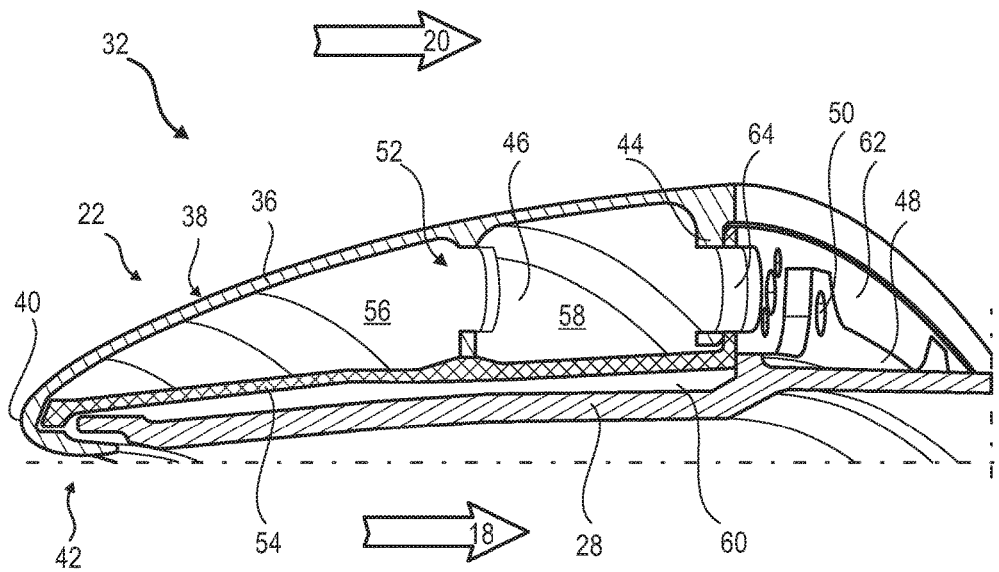
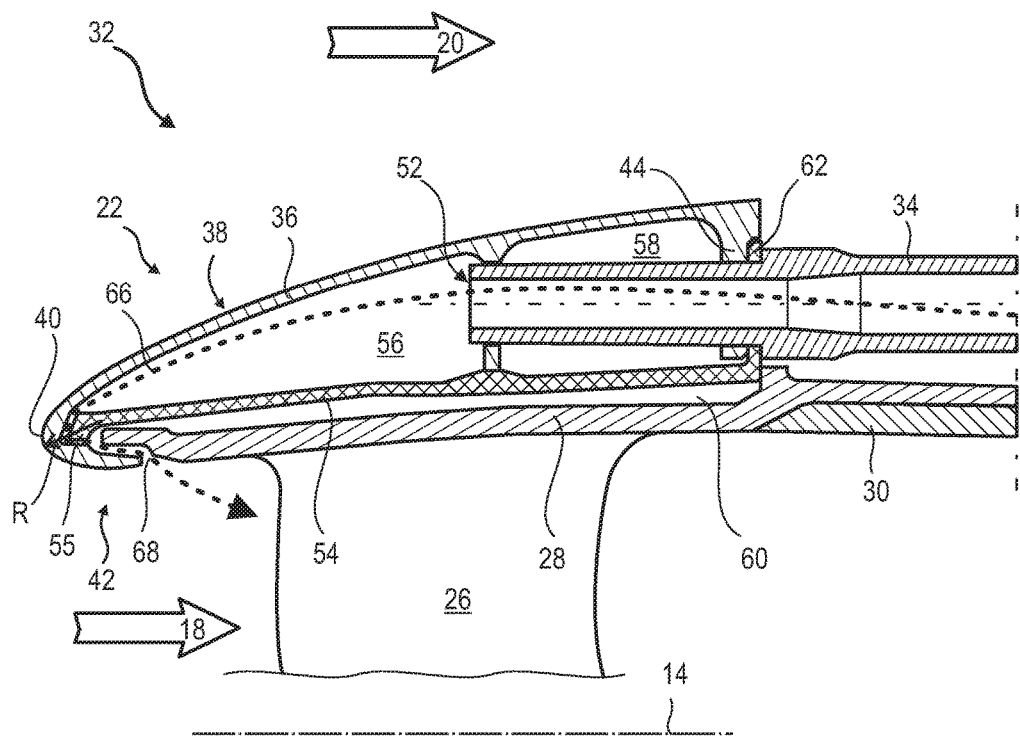

DE-ICING DEVICE FOR A SPLITTER NOSE OF AN AXIAL TURBINE ENGINE COMPRESSOR

CROSS-REFERENCE TO RELATED APPLICATIONS

This application claims the benefit, under 35 U.S.C. § 119, of BE 2015/5662 filed Oct. 15, 2015, the disclosure of which is incorporated herein by reference in its entirety.

FIELD

The invention relates to the field of turbine engine de-icing devices. More specifically, the invention relates to a de-icing device for a splitter nose at the intake of an axial turbine engine compressor. The invention also relates to an axial turbine engine, in particular a turbo-jet engine of an aeroplane.

BACKGROUND

When in flight, aeroplane turbo-jet engines are liable to icing. An ice deposit forms locally on certain surfaces. The ice layer increases in thickness and size, which tends to weigh down the aeroplane. Moreover, such deposits affect operation of the turbine engine by changing the geometry of the surfaces used to guide the flows required for operation of the turbo-jet engine.

The intake of the compressor can become obstructed near the splitter nose. The development of the ice layer transforms into a relatively thick ice deposit. The vibrations of the turbine engine can cause the ice to become detached in the form of solid blocks. If this occurs at the compressor intake, the blocks are aspirated by the compressor, causing damage to the blades of same. To obviate this risk, the splitter nose is fitted with an anti-icing or de-icing device.

Document US 2012/0192544 A1 discloses an axial turbine engine in which the compressor has a splitter-nose de-icing device. The device works by circulating hot air inside the nose, then re-injecting the air into the compressor. The air is conducted through a pipe towards an internal plenum before re-injection. This latter is delimited by a radial flange that is welded to an annular plate to improve the attachment and seal. However, welding results in expansion that adversely affects the correct positioning of the plate, thereby reducing control over the flow of hot air. This has an adverse effect on the efficiency of the de-icing. Furthermore, the seal of the weld is relative.

SUMMARY

The invention is intended to address at least one of the problems presented by the prior art. More specifically, the invention is intended to improve the sealing of a de-icing nose. The invention is also intended to propose a simple, robust, cheap, reliable solution that improves performance and is easy to produce and control.

The invention relates to a de-icing device for a splitter nose of a turbine engine, in particular for a compressor, the device comprising a splitter nose that includes an inner radial flange and that is shaped to separate a primary flow and a secondary flow of the turbine engine, a shroud arranged inside the splitter nose, a de-icing annular space between the nose and the shroud, in particular for circulation of a de-icing fluid, and a partition dividing the annular space annularly, that is noteworthy in that the partition includes an outer radial flange attached to the inner flange of the splitter nose.

In various embodiments, the device can also include one or several of the following characteristics, taken individually or in any technically possible combination.

The splitter nose includes means for centring the partition, the centring means, in various instances, being arranged to enable the press fitting of the partition in the centring means.

The partition includes an annular centring thickening in circular contact with the centring means and/or the centring means include an inner tubular surface with a surface condition Ra equal to or less than 3.00 µm, in various instances, equal to or less than 1.60 µm.

The shroud includes an outer annular ring attached to the inner flange, the outer flange being arranged axially between the inner flange and the ring.

The partition extends along substantially all of the axial length of the splitter nose.

The splitter nose includes an annular hook in which the outer shroud and/or the partition are engaged axially.

The upstream edge of the partition includes an upstream annular thickening with passages for the de-icing fluid and/or the upstream edge of the partition is flush or in circular contact with the back of the hook.

The device includes a sealed annular interface, in various instances, with a sealing gasket, between the inner flange and the outer flange and/or between the outer flange and the ring.

The device includes a feed pipe for de-icing fluid, in particular a hot gas, passing through each flange of the splitter nose and communicating with the annular space.

The device has a circular exhaust between the splitter nose and the shroud, the exhaust, in various instances, being in fluid communication with the annular space through the partition.

The device includes at least one, and, in various, instances, several, fitting bolts, attaching the outer flange to the inner flange, and potentially the shroud.

The device is arranged such that the partition, in various instances, in combination with the centring means, divides the annular space into at least three annular sub-spaces.

The shroud includes an axial half, in particular an upstream half that is not in contact with the partition.

The shroud includes an annular row of vanes extending radially inwards, the row being, in various instances, arranged upstream of the inner flange and/or there is no contact between the shroud and the partition near the vanes.

The shroud includes an inner ring seal, in particular a seal made of an abradable material, that is, in various instances, arranged downstream of the inner flange.

The splitter nose has a separation surface that is able to separate the flows, the surface having a profile of revolution with a radius of curvature R equal to or less than 5.00 cm at the leading edge of the nose, for example, equal to or less than 1.00 cm, for example, equal to or less than 0.30 cm.

The partition passes through the annular space, in particular axially.

The shroud and the partition overlap one another axially on an axial section where the device has a tubular compartment separating the shroud and the partition.

The outer annular ring extends radially towards the outside of the shroud.

The inner flange and/or the centring means of the nose extend radially inwards.

The nose has a leading edge, for example formed on the annular hook.

The hook opens axially downstream.

The fixing bolt or bolts pass axially through the inner flange and/or the outer flange and/or the ring.

The ring includes at least one outer scallop, in various instances, including a scallop enabling passage of a feed pipe.

In the disassembled state, the internal diameter of the centring means is at least 0.30 mm less than the diameter of the zone of the partition intended to cooperate with the centring means. This difference in diameter enables press fitting, in particular for an internal diameter of the centring means of between 0.50 m and 2 m, for example 1.7 m.

At least two, and in various instances three, elements including the nose, the partition and the shroud have equal coefficients of expansion.

The centring means are arranged axially between the leading edge and the downstream flange of the nose.

The inner radial flange of the splitter nose is a downstream flange, the centring means having or being a radial centring flange.

The outer flange and the inner flange are annular radial flanges.

The inner flange and the outer flange are in axial annular contact.

The invention also relates to a de-icing device for a splitter nose of a turbine engine, in particular for a compressor, the device comprising a splitter nose that is shaped to separate a primary flow and a secondary flow of the turbine engine, a shroud arranged inside the annular wall, a de-icing annular space between the nose and the shroud, in particular for circulation of a de-icing fluid, and a partition dividing the annular space annularly, that is noteworthy in that the nose includes means for centring the partition that are arranged to enable press fitting, for example sealingly.

The invention also relates to a turbine engine compressor, in particular a low-pressure compressor, comprising a de-icing device that is noteworthy in that the device is as claimed in the invention, the splitter nose, in various instances, delimiting the intake of the compressor.

According to various advantageous embodiments of the invention, the tubular portion divides the annular space into at least two overlapping circular spaces.

The invention also relates to a turbine engine, in particular an aeroplane turbo-jet engine, comprising a de-icing device, that is noteworthy in that the device is as claimed in the invention, the turbine engine preferably including a fan arranged upstream of the splitter nose and/or the turbine engine preferably including a compressor according to the invention.

According to various advantageous embodiments of the invention, the fan is able to power the aeroplane in flight.

In general, various advantageous embodiments of each objective of the invention are also applicable to other objectives of the invention. Where possible, each objective of the invention can be combined with other objectives.

The invention helps to maintain the seal of the device while guaranteeing that the flow rate of the de-icing fluid remains within a given range. The predetermined range is guaranteed for different operating temperatures and for different levels of vibration of the turbine engine. The partition is kept away from the shroud near the vanes of same, which limits the transmission of vibrations.

The solution is simple since it uses the bolts already required to attach the shroud to the nose. A single attachment operation joins the three elements together.

The centring means are designed to also provide a circular seal with the annular partition. The roughness Ra of 1.60 µm further improves the seal. This assembly method provides a seal that is adequate for the pressure and the fluid used, despite the expansion phenomena tending to open the contact between the partition and the centring means.

DRAWINGS

FIG. 3 is an exploded isometric view of a splitter nose according to various embodiments of the invention.

FIG. 4 is a cross section of a profile of revolution of the splitter-nose de-icing device according to various embodiments of the invention.

DETAILED DESCRIPTION

In the description below, the terms "inner" and "outer" refer to a position in relation to the axis of rotation of an axial turbine engine. The axial direction corresponds to the direction running along the axis of rotation of the turbine engine. The radial direction is perpendicular to the axis of rotation. Upstream and downstream refer to the main direction of flow of the flow in the turbine engine.

Figure 1:
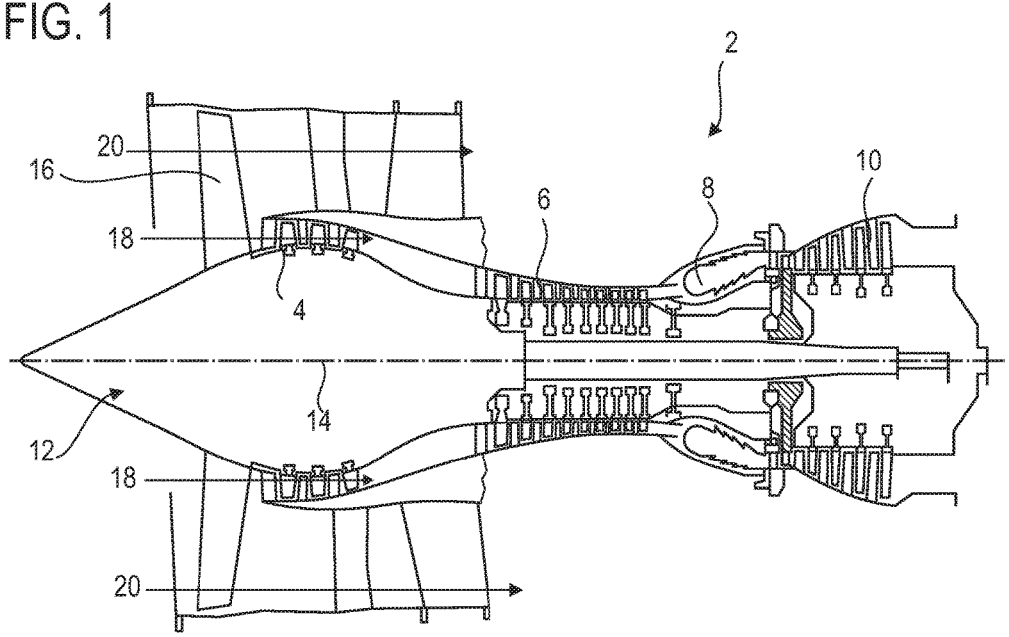
FIG. 1 shows an axial turbine engine according to various embodiments of the invention.

FIG. 1 is a simplified representation of an axial gas turbine engine. In this specific case, it is a dual-flow turbo-jet engine. The turbo-jet engine 2 has a first compression level, referred to as the low-pressure compressor 4, a second compression level, referred to as the high-pressure compressor 6, a combustion chamber 8, and one or more turbine levels 10. When in operation, the mechanical power of the turbine 10 transmitted via the central shaft to the rotor 12 moves the two compressors 4 and 6. These latter have several rows of rotor blades associated with rows of stator vanes. The rotation of the rotor 12 about the axis of rotation 14 thereof thereby enables an air flow to be generated and progressively compressed until it enters the combustion chamber 8.

An inlet fan 16 is coupled to the rotor 12 and generates an air flow that is divided into a primary flow 18 passing through the different levels mentioned above of the turbine engine, and a secondary flow 20 that passes through an annular duct (partially shown) along the machine before re-joining the primary flow at the outlet of the turbine. The secondary flow 20 can be accelerated to generate a thrust reaction. The primary flow 18 and the secondary flow 20 are radially concentric annular flows.

Figure 2:
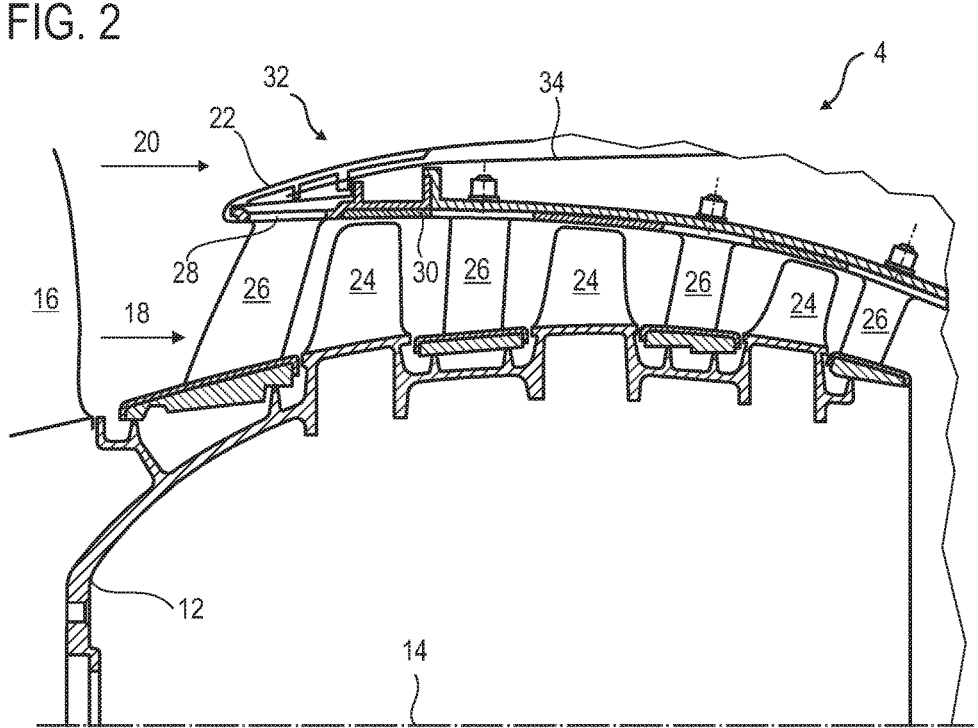
FIG. 2 shows a turbine engine compressor according to various embodiments of the invention.

FIG. 2 is a cross section of a compressor of an axial turbine engine, such as the one in FIG. 1. The compressor can be a low-pressure compressor 4. FIG. 2 shows a portion of the fan 16 and the splitter nose 22 sharing the flow coming from the turbine engine between the primary jet of the primary flow 18 and the secondary jet of the secondary flow 20. The rotor 12 includes several rows of rotor blades 24, in this case three.

The low-pressure compressor 4 includes several guide vanes, in this case four, that each contain a row of stator vanes 26. The guide vanes are related to the fan 16 or to a row of rotor blades 24 to guide the air flow, such as to convert the speed of the flow into static pressure. The stator vanes 26 extend essentially radially from an outer casing or from an outer shroud 28. The casing and the outer shroud 28 include internal sealing means, each surrounding and associated row of rotor blades 24. An annular layer of abradable material 30 is applied to the inner surface of the outer shroud 28. Abradable material is a material that is liable to be eroded in contact with the rotor blades 24 to ensure the rotor blades 24 are not damaged.

In order to safeguard the compressor 4 from icing phenomena around the splitter nose 22 is fitted with a de-icing device 32 acting on the nose, and potentially on the inlet stator vanes 26 of the compressor 4, referred to as inlet guide vanes (IGV). A pipe 34 supplies the de-icing device 32 with de-icing fluid. The de-icing device 32 is able to prevent the formation of ice, or to melt the ice already formed. The de-icing device 32 can operate alternately.

FIG. 3 is an isometric view of the de-icing device 32, as shown in FIG. 2.

The splitter nose 22 has an annular outer wall 36. The separation surface 38 of the outer wall 36 guides and is in contact with the secondary flow 20. Upstream, it has a circular leading edge 40 that enables the flows entering the turbine engine to be split into the primary flow 18 and the secondary flow 20. The shape of this wall 36 at the upstream end is an annular hook 42. It also comprises the leading edge 40 and splits the primary and secondary flows 18 and 20. It turns back on itself to hold the outer shroud 28. Downstream, potentially at the downstream end of same, the wall 36 has an inner downstream attachment flange 44. A centring flange 46 is arranged between the leading edge 40 and the downstream inner flange 44. These flanges 44 and 46 of the nose 22 extend radially inwards and are annular.

The outer shroud 28 is attached to the hook 42 and has an upstream tubular surface in contact with the inner surface of the hook 42, which enables centring. Notches are formed in the thickness of this surface to form exhaust channels for the de-icing fluid. The shroud 28 has an external attachment ring 48 used to attach the downstream inner flange 44 using bolts (not shown). These bolts are engaged in axially aligned orifices 50.

The wall 36 and the shroud 28 together define a de-icing space 52 through which the fluid used to de-ice the splitter nose 22 passes. This space 52 is compartmentalized by a partition 54 also referred to as a plenum. This can be a generally tubular partition. This partition 54 makes it possible to divide the space into at least two annular compartments forming sub-spaces (56, 58 and 60).

The partition 54 has an outer annular flange 62 that extends radially outwards and that is attached both to the ring 48 and to the downstream inner flange 44 using the bolts used to join the shroud 28 to the nose 22. This helps to save on attachment means and simplifies assembly since a single operation enables all three elements to be attached.

The outer flange 62 is arranged axially between the ring 48 and the downstream inner flange 44. This forms a three-layer stack that improves rigidity. The interfaces between same are sealed to contain the flow of de-icing fluid, and ring seals (not shown) can be interposed. The nose 22, the partition 54 and the shroud 28 can be made of the same titanium alloy. Each part can be a one-piece part. An opening 64 passes through the downstream inner flange 44 and the outer flange 64 to receive the feed pipe.

FIG. 4 shows a cross section of the splitter nose 22, as shown in FIG. 3. A stator vane 26 is shown connected to the outer shroud 28, representing the row of vanes attached to the shroud.

In profile, the annular space 52 is in this case divided into three annular sub-spaces (56, 58 and 60). The upstream outer sub-space 56 is delimited by the centring flange 46 and the upstream portion of the partition 54. It receives the deicing fluid 66 before re-injection with the primary flow 18. The downstream outer sub-space 58 is crossed by the pipe and framed by the flanges (44 and 46) of the nose 22. The inner sub-space extends along substantially all of the length of the partition 54. It maintains a radial gap between the shroud 28 and the partition 54, which provides radial thermal insulation. This helps to contain the thermal expansion of the shroud 28.

The feed pipe 34 distributes the de-icing fluid 66. The pipe 34 can have a single one-piece portion passing axially through each flange (44 and 46) of the nose 22 for an improved seal. The de-icing fluid 66 is advantageously a hot gas, for example drawn from the low-pressure compressor. The fluid 66 can be taken from the high-pressure compressor, or a turbine.

The path of the de-icing fluid 66 is shown using a dotted line. It passes through the annular space 52, and in particular the upstream outer sub-space 56. The presence of hot gas in this compartment helps to heat the nose 22, and in particular the wall 36 of the nose 22. If any ice has formed thereon, the ice will be melted through the wall 36 by thermal conduction. The fluid 66 can be discharged from the device via the exhaust 68. To do so, the fluid 66 enters the hook 42 and moves around the upstream edges of the partition 54, which is provided with a thickening 55, and of the shroud 28 respectively. By entering same, the hot fluid 66 is in contact with the hook 42 and heats same close to the leading edge 40. The hot fluid 66 is then reinjected towards the stator vanes 26 to achieve an anti-icing effect.

Downstream of the vane 26, the shroud 28 carries the abradable layer 30. This layer 30 is arranged downstream of the downstream flange 44 and/or of the outer flange 62. The layer 30 can start downstream of the partition 54, which protects same from the de-icing heat. Consequently, the layer 30 can include a polymer.

The leading edge 40 forms a circular knife that can lie within a plane perpendicular to the axis of rotation 14. The separation surface 38 of the nose 22 can have a profile of revolution about the axis 14. At the leading edge, the radius of curvature R of the profile is equal to or less than 6 cm, and in various instances, equal to or less than 4.00 mm.

The nose 22 includes centring means for the partition 54. This can be the centring flange 46 of same. The centring means 46 include a tubular surface maintaining the annular partition 54, enabling concentricity to be guaranteed. The fit between the centring means 46 and the partition 54 can be a press fit. When these elements are disassembled, a difference in diameter of at least 0.30 mm is provided in the zones of same that are designed to cooperate. The external diameter of the partition 54 is substantially greater than the internal diameter of the centring means 46. The difference in diameter can be measured on the annular over thickness of the partition. The centring means 46 are designed such that an axial force of between 50 N and 1000 N enables the partition to be fitted into the nose, for example, a force between 100 N and 500 N. The mechanical press fit helps to maintain a seal between the outer sub-spaces, even in the event of differential expansion opening the nose 22.

What is claimed is:

1. A turbine engine splitter nose de-icing device, said device comprising:
   a splitter nose that includes an inner flange and is structured and operable to separate a primary flow and a secondary flow of the turbine engine;
   a shroud arranged within the splitter nose;
   a de-icing annular space between the splitter nose and the shroud; and
   a partition dividing the annular space annularly, the partition comprising a tubular portion and an outer flange that projects radially outwards from and perpendicularly to the tubular portion and away from the shroud, and is attached to the inner flange of the splitter nose, wherein the partition extends along substantially the entire axial length of the splitter nose.

2. The turbine engine splitter nose de-icing device of claim 1, wherein the splitter nose includes a radial centering flange for centering the partition.

3. The turbine engine splitter nose de-icing device of claim 2, wherein the centering flange is arranged to enable the press fitting of the partition in the centering flange.

4. The turbine engine splitter nose de-icing device of claim 2, wherein the partition includes an annular centering thickening in circular contact with the centering flange.

5. The turbine engine splitter nose de-icing device of claim 2, wherein the centering flange includes an inner tubular surface with a surface roughness Ra of at most 1.60 µm.

6. The turbine engine splitter nose de-icing device of claim 1, wherein the splitter nose includes an annular hook in which the shroud and the partition are engaged axially.

7. The turbine engine splitter nose de-icing device of claim 1, further comprising a sealed annular interface between the inner flange and the outer flange.

8. The turbine engine splitter nose de-icing device of claim 1, wherein the outer flange includes a circular free outer edge.

9. The turbine engine splitter nose de-icing device of claim 1 further comprising a feed pipe for de-icing fluid, the feed pipe crossing axially the outer flange of the partition and being in flow communication with the annular space.

10. The turbine engine splitter nose de-icing device of claim 1, wherein the partition divides the annular space into at least three annular sub-spaces.

11. The turbine engine splitter nose de-icing device of claim 1, wherein the shroud includes an axial half that is contactless with the partition.

12. The turbine engine splitter nose de-icing device of claim 1, wherein the shroud includes an inner ring seal that is arranged downstream of the outer flange.

13. A turbine engine compressor, said compressor comprising:
an intake; and
a de-icing device, wherein the de-icing device comprises:
a splitter nose that includes an inner flange and delimits the intake of the compressor;
a shroud arranged radially inside the splitter nose and including an outer ring;
a de-icing annular space between the nose and the shroud; and
a partition dividing the annular space annularly and including a tubular portion and an outer flange that projects radially outwards from and perpendicularly to the tubular portion and away from the shroud,
wherein the outer ring of the shroud, the inner flange of the splitter nose and the outer flange of the partition form a three-layer stacking at the most downstream location of the partition and of the nose,
wherein the outer flange of the partition axially joins the outer ring of the shroud to the inner flange of the splitter nose.

14. The turbine engine compressor of claim 13, wherein the shroud includes an annular row of vanes extending radially inward, the partition being contact free with the shroud.

15. A turbine engine, said engine comprising:
a primary flow;
a secondary flow; and
a de-icing device, wherein the de-icing device comprises:
a splitter nose that includes an inner radial flange and is structured and operable to separate the primary flow and the secondary flow;
a shroud arranged radially inside the splitter nose;
a de-icing annular gas passage between the nose and the shroud; and
a partition dividing annularly the annular gas passage, wherein the partition comprises a tubular portion and an outer flange that projects radially outward from and perpendicularly to the tubular portion and away from the shroud,
wherein the splitter nose includes a centering flange for centering the partition, the centering flange pressing against the tubular portion of the partition at a location where the partition is thickened.

16. The turbine engine of claim 15, wherein the centering flange presses the partition circularly and inward in order to achieve a sealing interface.

\* \* \* \* \*